Figure 1:
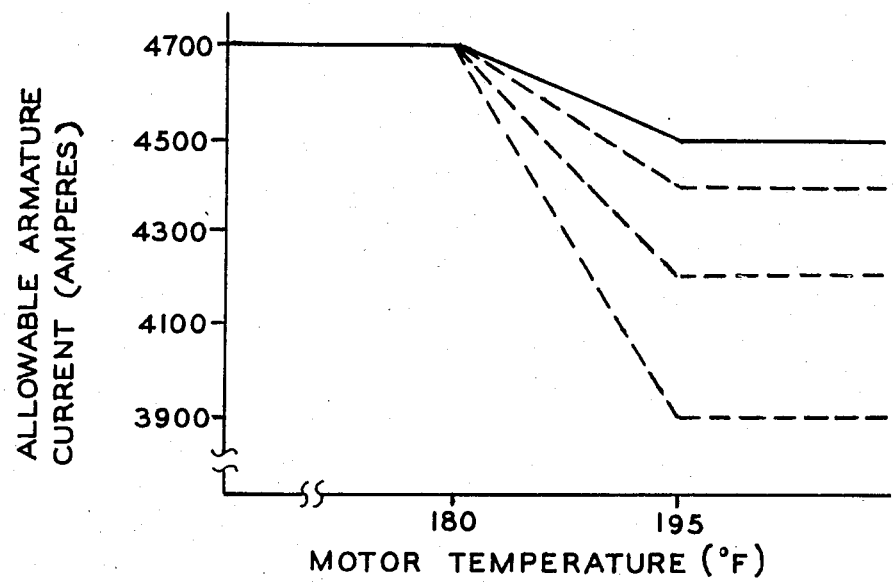

United States Patent [19]

Letterman

[11] Patent Number: 4,626,753
[45] Date of Patent: Dec. 2, 1986

[54] MOTOR SPEED CONTROL BY MEASUREMENT OF MOTOR TEMPERATURE

[75] Inventor: Donald E. Letterman, Warrick County, Ind.

[73] Assignee: Aluminum Company of America, Pittsburgh, Pa.

[21] Appl. No.: 662,591

[22] Filed: Oct. 19, 1984

Related U.S. Application Data

[63] Continuation-in-part of Ser. No. 546,696, Oct. 28, 1983, abandoned.

[51] Int. Cl.⁴ .......................... H02P 5/00; H02H 5/04
[52] U.S. Cl. .................................. 318/334; 318/399; 318/471; 318/473; 361/25
[58] Field of Search ............... 318/334, 399, 471, 472, 318/473, 634, 783; 361/23, 24, 25, 26, 27

[56] References Cited

U.S. PATENT DOCUMENTS 3,629,676 12/1971 Ephraim ..................... 318/473 X
4,004,204 1/1977 Hoves et al. ..................... 318/472
4,426,604 1/1984 Doemen et al. ............... 318/473 X

FOREIGN PATENT DOCUMENTS 57-75581 5/1982 Japan ...................................... 361/24

Primary Examiner—William M. Shoop, Jr.
Assistant Examiner—Bentsu Ro
Attorney, Agent, or Firm—Elroy Strickland

[57] ABSTRACT

A process for controlling the speed of an electric motor. A reference value of motor temperature is provided and directed to a summing junction. The actual temperature of the motor is sensed and also directed to the summing junction. The two values are summed and employed as a reference of motor current. This reference is directed to a second summing junction while the value of actual motor current is sensed. The actual value is also directed to the second junction. These last two values are summed at the second junction to provide a reference for adjusting motor speed.

3 Claims, 4 Drawing Figures

MOTOR SPEED CONTROL BY MEASUREMENT OF MOTOR TEMPERATURE

CROSS-REFERENCE TO RELATED APPLICATION

This application is a continuation-in-part of U.S. application Ser. No. 546,696, filed Oct. 28, 1983, now abandoned.

BACKGROUND OF THE INVENTION

The present invention relates generally to the control of armature current in an electric motor and more particularly to controlling motor output by measuring motor temperature.

An electric motor can generally do more work if the temperature of the motor is allowed to rise. The temperature of the motor, of course, should not rise to a level at which components of the motor, such as the solder connections and insulation, would be damaged by excessive heat. If the temperature of the motor rises above the melting point of solder, the connections effected by solder come loose, and melted solder is thrown from the rotating armature of the motor.

The speed of a motor can be increased by increasing the amount of current conducted through the armature of the motor. This is particularly important in motors employed in industrial processes, such as in rolling mills, to increase the output of the mill. Such an increase in output can significantly reduce unit cost of the product of the mill, as more sheet product, for example, is produced in a shorter period of time.

BRIEF SUMMARY OF THE INVENTION

The present invention is directed to a method of increasing the output of an electrical motor by allowing as much current as possible to flow through its armature without damaging the same by excess current. The method of the invention includes establishing a temperature set point and supplying current to the motor in increasing amounts while closely monitoring the temperature of the motor. As the temperature of the motor approaches the set point, motor current is gradually decreased to keep the temperature from exceeding the set point.

THE DRAWINGS

Figure 2:
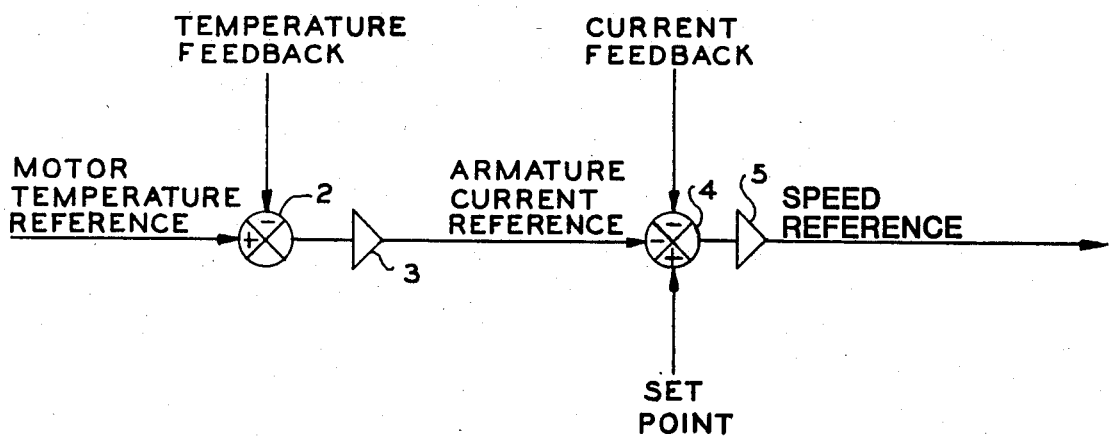
Figure 3:
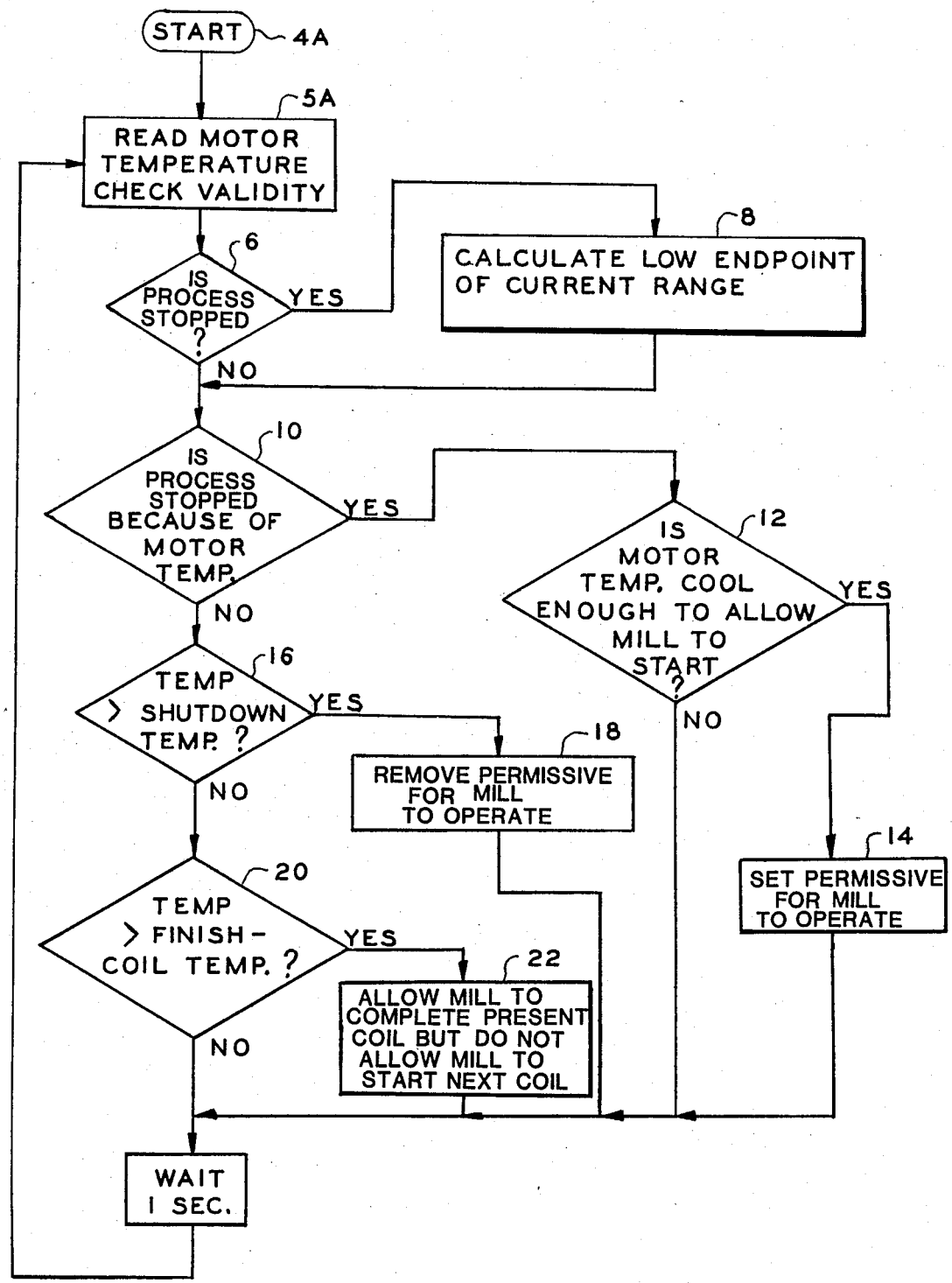
Figure 4:
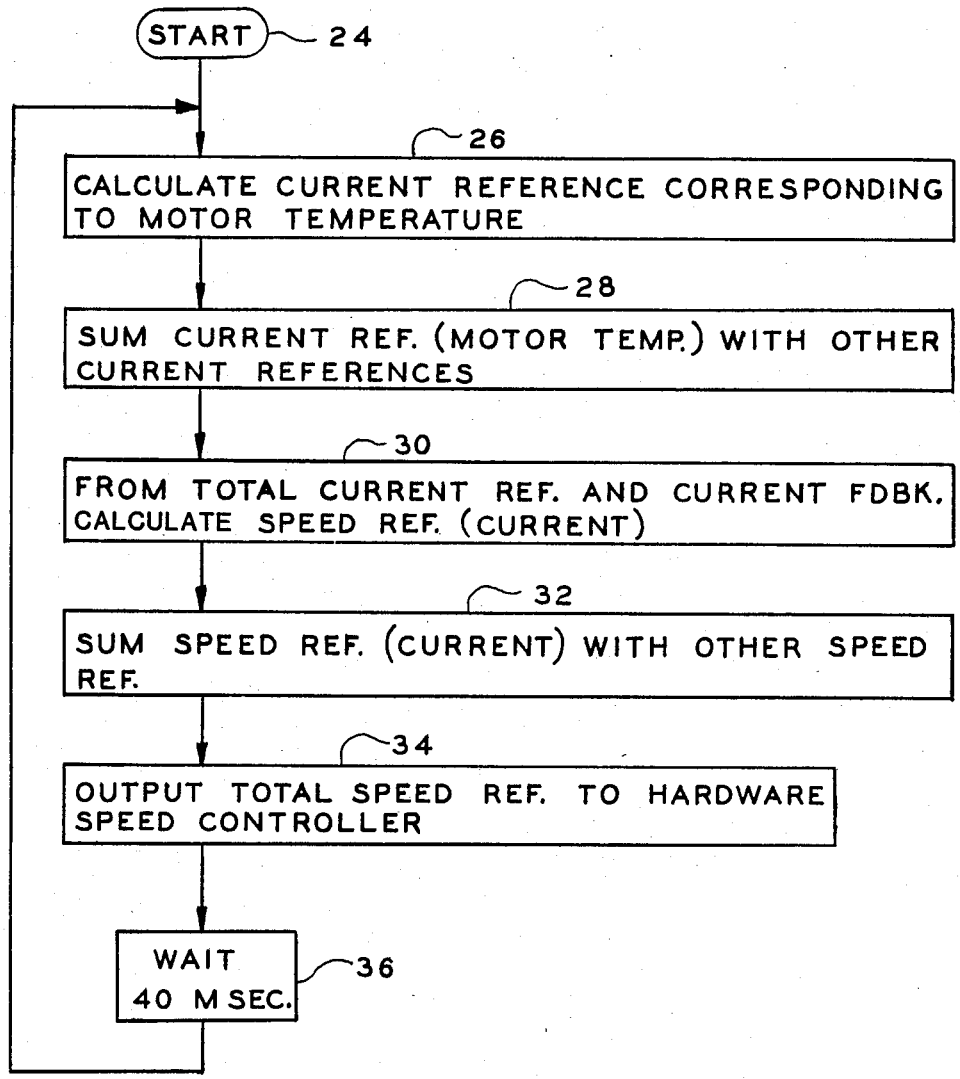

The invention, along with its advantages and objectives, will be best understood from consideration of the following detailed description and accompanying drawings in which:

FIG. 1 is a graph showing the relationship of motor temperature (in Fahrenheit) to allowable armature current, in amperes, FIG. 2 is a schematic diagram showing the basic process of the invention, and FIGS. 3 and 4 are flow diagrams showing decisions of the process in controlling motor temperature and motor output.

PREFERRED EMBODIMENT OF THE INVENTION

Referring now to the drawings, FIG. 1 thereof shows a graph plotting armature current of a motor (not shown) against the operating temperature of the motor. The present invention was tested on a motor having the current range (3900 to 4700 amperes) shown on the ordinate of the graph. The invention, however, is not so limited as the concept of the invention is applicable to any motor that can be controlled in terms of its current and temperature. As represented by the graph of FIG. 1, 4700 amperes of electrical current was the maximum current pulled by the motor, and as long as the temperature of the motor remained below a set point temperature of 180° F., as indicated on the abscissa of the graph, the motor was allowed to pull such current. If the temperature of the motor, however, rose above the set point temperature, current was gradually decreased in the manner shown by the graph.

The basic method and process of the invention are depicted in the schematic diagram of FIG. 2. As indicated at the left of the figure, a temperature reference is provided and directed to a summing junction 2 in a digital computer (not otherwise shown). This reference is preferably manually selected and is the set point discussed above.

The actual temperature of the motor is read, for example, by a sensor embedded in the windings of the motor and is fed back to junction 2. A summation of the two values is provided by the junction and a corresponding current reference calculated at triangle 3. This reference is then directed to a second summing junction 4, as a reference of armature current. The current pulled by the armature in operation is then measured and fed back to summing junction 4 to be summed with the current reference provided by the first junction 2.

In addition, a main current reference or set point, as established by personnel operating a rolling mill, for example, is also supplied to junction 4 and summed with the other values directed thereto. The output of 4 is employed in calculating a speed reference at 5 for adjusting the speed of the motor. Such a reference denotes a value that controls acceleration of the mill when the mill is started and deceleration of the mill when the mill is stopped. The reference also holds the mill at running speed in performing its operation on the product of the mill.

The set point provided at junction 4 in FIG. 2 is that of the high end of the current range for the motor being controlled. In FIG. 1, this would be 4700 amperes. If 180° is chosen as the temperature reference directed to junction 2 and the temperature sensed in the motor armature (and fed back to junction 2) is in excess of 180°, the increase is subtracted at junction 2 to lower the current reference directed to junction 4. This, in turn, lowers the sum out of 4 to provide a lower speed reference. This lower reference orders a decrease in motor speed, for example, by strengthening the field of the motor. This lowers motor armature current. The lower speed of the motor (and current drawn) remains until the temperature of the motor decreases.

FIGS. 3 and 4 of the drawings are charts showing the flow of decisions in connection with the above description of motor control when the motor is employed in driving the rolls of a rolling mill. The output of the mill is coiled in a coiling process to provide a coiled product (not shown) of the mill.

There are two programs involved. One program (FIG. 3) makes decisions concerning starting and stopping the motor. The other program (FIG. 4) makes decisions concerning control of current magnitude while the motor is in operation.

In the programs of FIG. 3 and FIG. 4, the above-mentioned digital computer is programmed to start the temperature reading and control process, as indicated by start boxes 4A and 24 in FIGS. 3 and 4 respectively, when the computer is turned on. The computer must be "on" before the process of rolling and coiling can begin and, once turned on, the computer and the above two programs run continuously, independently of starting and stopping the mill, in performing the temperature reading and control processes.

In the program of FIG. 3, the computer first makes a reading of motor temperature and checks the validity of the reading (at box 5A) by noting the values of recent previous readings. In this manner, the value forwarded to junction 2 in FIG. 2 is a correct reading and not an abnormal or anomalous reading, as any change in motor temperature is usually gradual.

The computer next determines at 6 whether or not the coiling process is stopped. If the answer to this question is yes, the low end point of the current range of the motor is calculated is indicated by box 8 in FIG. 3. This low end point of the current range is the current which is allowed at the highest motor temperatures. The low end point determines which line is used in the graph shown in FIG. 1 for the program described below in connection with FIG. 4. If the motor temperature is above a certain manually chosen temperature, say 190°, the low end point of the current range is decreased; conversely, if the motor temperature is below 190°, the low end point is increased.

If the coiling process is stopped, the computer determines if this has occurred because of the temperature of the motor, as indicated by decision box 10. If the answer is yes, the computer then determines if the temperature of the motor is cool enough to permit restart of the process, as indicated by decision box 12. If the answer is yes, the computer then permits the process to restart, as shown by box 14. If the answer to the question of 12 is no, the computer waits a period of time, such as one second, then recycles again to check again the temperature of the motor as indicated by box 5A.

If the process is not stopped because of motor temperature at 10, the computer at 16 then asks the question: Is the temperature of the motor greater than shut down temperature (a temperature at which continued operation would cause damage to the motor)?. If the answer is yes, the computer immediately removes the permissive for the process to continue (which by other means causes the mill to stop), as indicated by box 18. If on the other hand, the answer is no at 16, the computer than goes on to the next step and question 20. The question asked at 20 is whether or not the temperature of the mill motor is now greater than that temperature which would be allowable at the end of the coiling process (a temperature which is less than the above shut down temperature). If the answer here is yes, the present coil is allowed to finish, but the permissive is removed which would allow another coil to start, as indicated by box 22 in FIG. 3. If the answer is no at 20, the system is programmed to wait a predetermined period of time, such as one second, before returning again to box 5A and again proceeding through the temperature reading and control processes of FIG. 3.

The second program of the digital computer is shown in FIG. 4. The program of this process is started at box 24 when the computer is turned on, as stated earlier. At box 26 a current reference is calculated corresponding to motor temperature. This calculation involves the graph shown in FIG. 1 and follows the line (solid or dash) in FIG. 1 chosen by the calculation of box 8 of FIG. 3 described above. Therefore, if the motor temperature increases during operation, the resulting current reference at box 26 decreases in an effort to reduce the amount of heat produced in the motor. This is the armature current reference calculated at triangle 3 in FIG. 2. Decreasing the current reference is an effort to keep the motor temperature below one of the values which would stop the motor as described in the program of FIG. 3.

The computer now provides a total current reference at 28, which includes the main or set point current value provided by the operator at junction 4 in FIG. 2. From this reference and the current reference fed back to the summing junction 4 in FIG. 2, the computer determines at 30 the speed reference in terms of current, as discussed above in reference to 5 in FIG. 2.

The computer now sums at box 32 the speed reference with other speed references, such as that provided by operating personnel, and provides an output at 34 that is a total speed reference. This reference controls a hardware speed controller (not shown) wired to the motor under control.

As indicated by box 36, a certain waiting period can be provided before the processes of FIG. 4 are performed again. These processes provide a continuous update of the temperature-current relationship of the motor under control such that overheating of the motor is prevented.

While the invention has been described in terms of preferred embodiments, the claims appended hereto are intended to encompass all embodiments which fall within the spirit of the invention.

What is claimed is:

1. A method of controlling the speed of an electric motor for maximum productive effort, comprising the steps of:
    calculating a low end point for a range of allowable motor current values based on the temperature of the motor when the motor is stopped,
    providing a reference value of motor temperature when the motor is running and directing the same to a summing location,
    sensing the actual temperature of the motor and directing the same to said summing location,
    summing the reference and actual temperature values at said summing location to provide a summation of the two values,
    calculating the position that said summation occupies in a range of motor temperatures,
    using said summation to calculate a corresponding current reference from said range of allowable motor current values,
    directing said current reference to a second summing location,
    sensing the actual current down by the motor and directing the value thereof to the second summing location, and
    summing the two current values and using the summation to change the amount of current drawn by the motor by providing an adjustment of motor speed.

2. The method of claim 1 including the step of performing the method of claim 1 continuously and independently of a process of making a coil of the product of a rolling mill.

3. The method of claim 2 including the steps of removing a permissive to continue the coiling process if the temperature of the motor exceeds a predetermined value and continuing such removal until the temperature of the motor falls to or below said predetermined value.

* * * * *